United States Patent

Dullien et al.

[19]

[11] Patent Number: 6,063,165

[45] Date of Patent: *May 16, 2000

[54] PROCESS AND DEVICE FOR ELIMINATING THE PARTICLES CONTAINED IN A STREAM OF FLUID

[75] Inventors: Francis A. L. Dullien, 36, Stoke Drive, Kitchener, Ontario, Canada, N2N 1Z4; Jean-Charles Viltard, Valence, France

[73] Assignees: Institut Francais Du Petrole, Rueil-Malmaison, France; Francis A. L. Dullien, Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/727,641

[22] Filed: Mar. 27, 1997

Related U.S. Application Data

[63] Continuation of application No. 08/406,393, Mar. 20, 1995, abandoned, which is a continuation-in-part of application No. 08/290,883, Sep. 13, 1994, abandoned.

[30] Foreign Application Priority Data

Apr. 14, 1994 [GB] United Kingdom .................. 9407441

[51] Int. Cl.$^7$ ................................................. B01D 45/00
[52] U.S. Cl. ............................... 95/267; 95/272; 55/308; 55/442; 96/393
[58] Field of Search ............................. 55/307, 308, 437, 55/440, 442, 464, 473, 476, 477, 482, 497, DIG. 39, DIG. 44, 443, 445, 465; 96/67, 129, 390, 393, 391, 392, 394, 395, FOR 174; 95/267, 272

[56] References Cited

U.S. PATENT DOCUMENTS

| | | | |
|---|---|---|---|
| 885,185 | 4/1908 | Serrell | 55/464 |
| 1,743,050 | 1/1930 | Straus | 96/395 |
| 1,898,591 | 2/1933 | Mohler et al. | 55/440 |
| 1,914,681 | 6/1933 | Cartmell | 96/350 |
| 1,958,586 | 5/1934 | Miller | 55/465 |
| 2,181,232 | 11/1939 | Haag | 55/465 |
| 2,457,292 | 12/1948 | Williams | 55/442 |
| 2,468,354 | 4/1949 | Abbrecht | 96/395 |
| 2,527,392 | 10/1950 | Bradshaw | 55/308 |
| 2,850,169 | 9/1958 | Briggs | 96/392 |
| 2,896,743 | 7/1959 | Bradshaw | 55/308 |
| 2,935,158 | 5/1960 | Braun | 96/395 |
| 3,289,399 | 12/1966 | Princiotta, Jr. | 55/445 |
| 3,304,696 | 2/1967 | McKenna | 55/440 |
| 3,487,610 | 1/1970 | Brown et al. | 96/390 |
| 3,616,623 | 11/1971 | Reid | 55/440 |
| 4,047,894 | 9/1977 | Kuhl | 95/236 |
| 4,364,730 | 12/1982 | Gustafsson | 55/440 |
| 4,627,861 | 12/1986 | Ibaraki et al. | 96/393 |
| 4,686,041 | 8/1987 | Van Den Berg et al. | 96/392 |
| 5,626,651 | 5/1997 | Dullien | 55/308 |

FOREIGN PATENT DOCUMENTS

| | | |
|---|---|---|
| 429327 | 1/1948 | Italy . |
| 237326 | 7/1925 | United Kingdom . |
| 632360 | 11/1949 | United Kingdom . |

*Primary Examiner*—C. Scott Bushey
*Attorney, Agent, or Firm*—Anotnelli, Terry, Stout & Kraus, LLP

[57] ABSTRACT

The present invention relates to a process and a device for eliminating particles from a stream of fluid, having a channel for turbulent flow of the fluid and a series of objects placed along the channel.

3 Claims, 14 Drawing Sheets

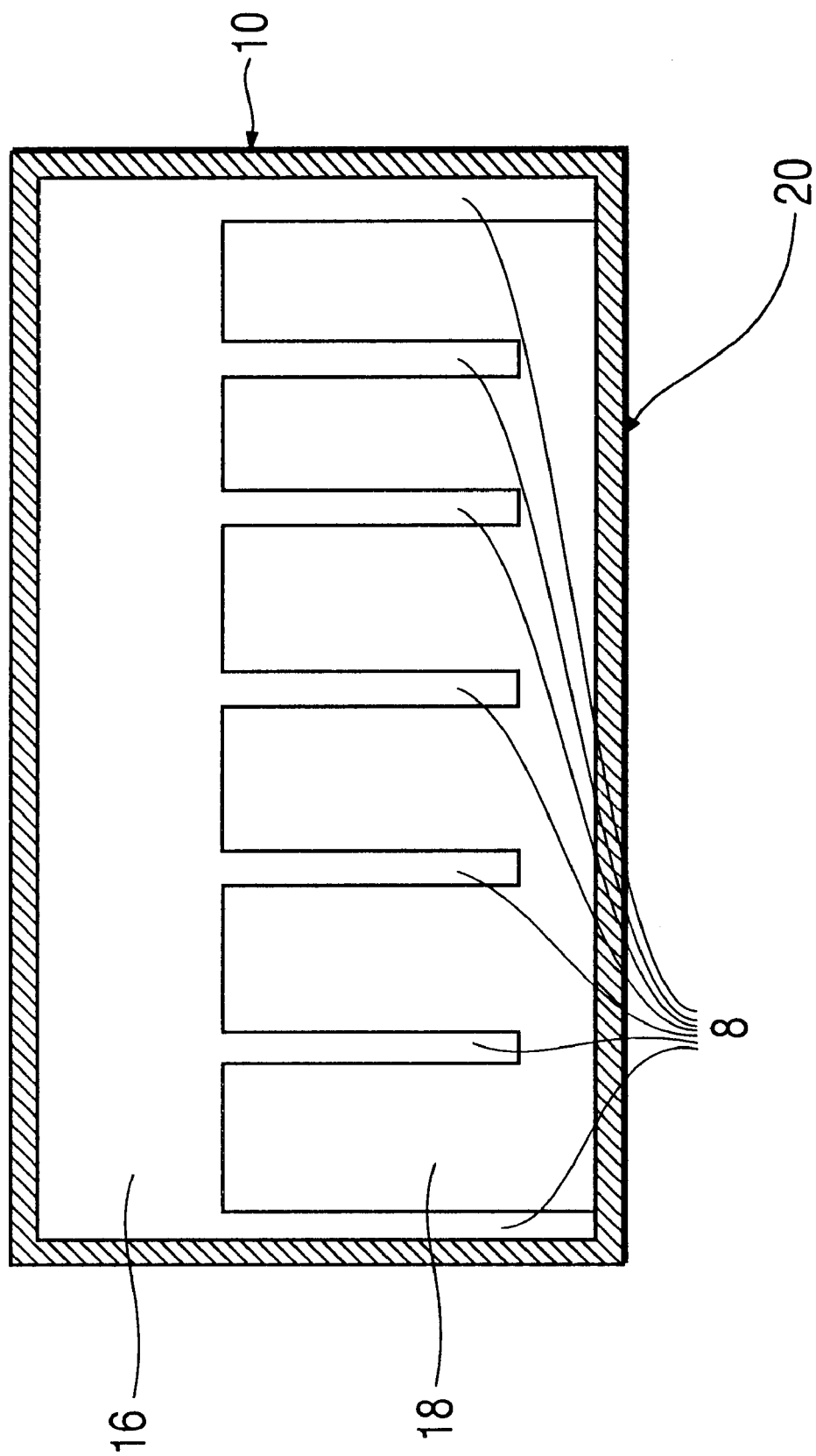

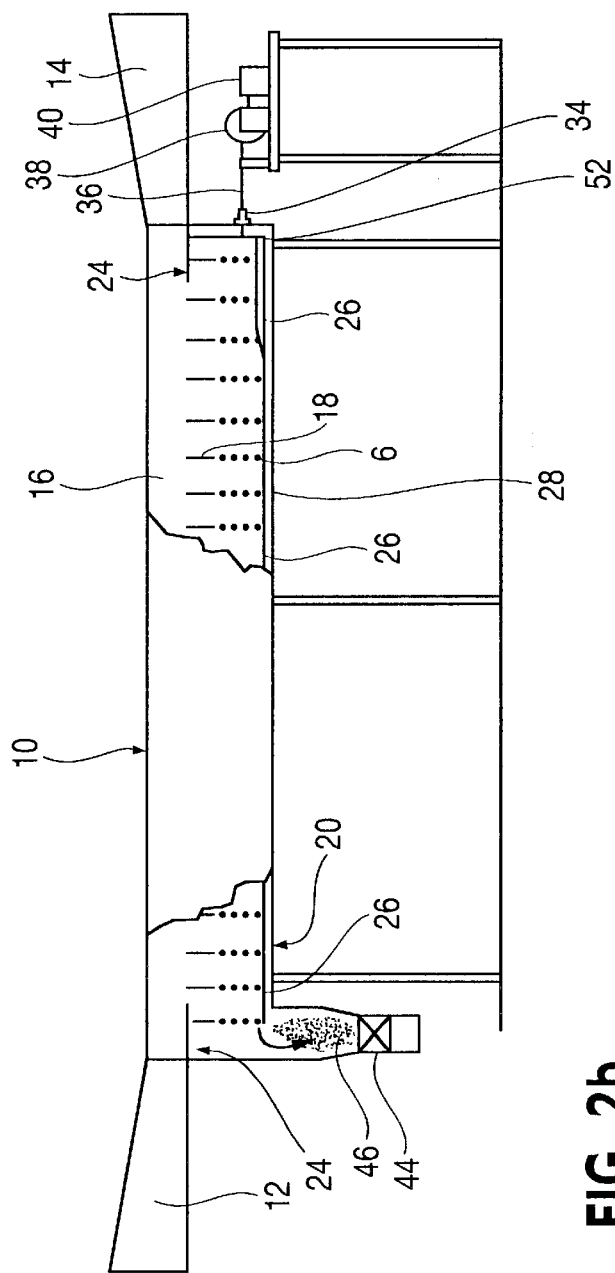
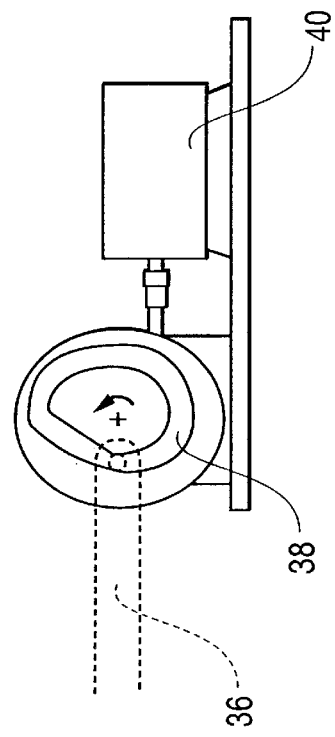

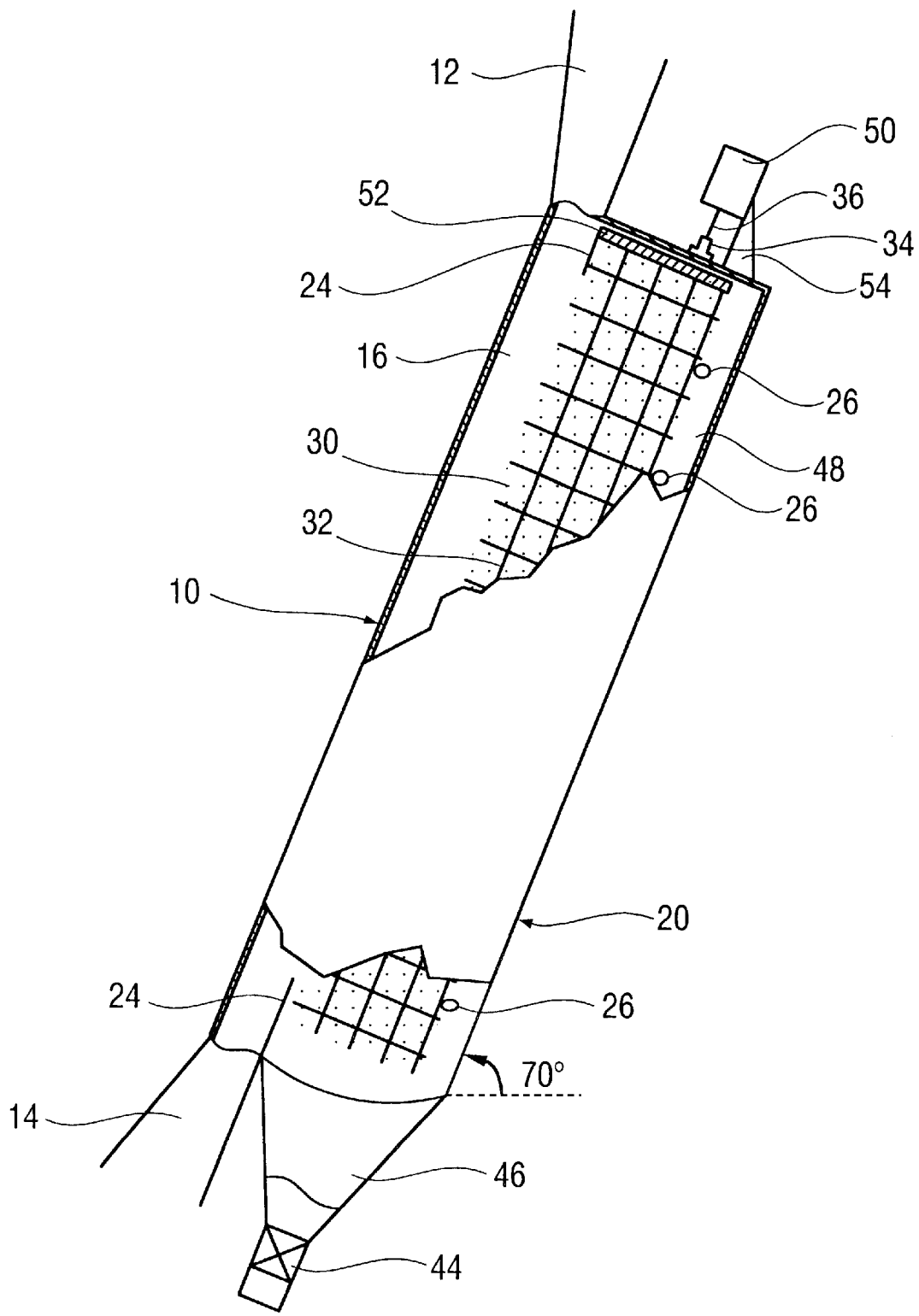

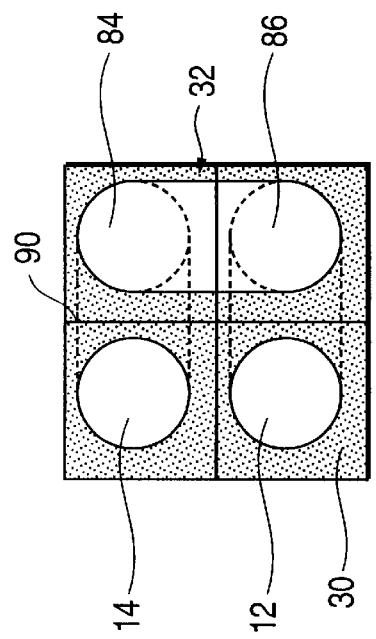
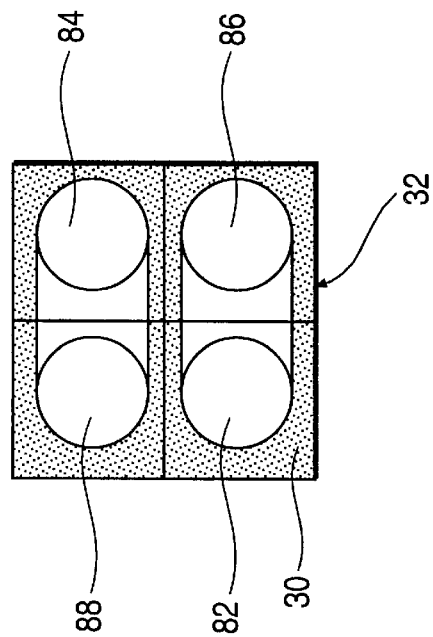
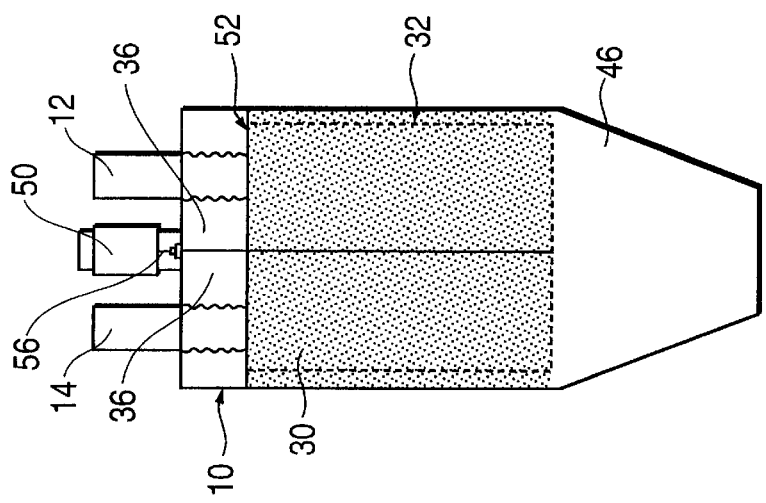

PROCESS AND DEVICE FOR ELIMINATING THE PARTICLES CONTAINED IN A STREAM OF FLUID

This application is a national stage application, filed under 35 U.S.C. 371, of PCT/FR95/00489, filed Apr. 13, 1995, which is a continuation of U.S. application Ser. No. 08/406,393, filed Mar. 20, 1995, now abandoned, which is a continuation-in-part of U.S. application Ser. No. 08/290,883, filed Sep. 13, 1994, now abandoned.

The present invention relates to the elimination of fine particles contained in gases. The present invention in particular facilitates separation and recovery of particles such as dust, mist, vapors, smoke, and harmful gases, etc. dispersed in a gas having a turbulent flow regime, benefiting from certain effects linked to turbulence in a specific and novel manner and using purely mechanical means.

Individuals skilled in the art of fluid mechanics and allied fields know that the fine particles dispersed in a fluid having turbulent flow tend to follow the vortices in the turbulent fluid.

Separation of very fine particles with sizes between 0.01 and 100 microns and contained in industrial gases or in ambient air is a complex and expensive operation. The devices usually employed for this purpose include electrical dust removers, various filters, and wet dust removers. Scrubbers are also used to eliminate the harmful gases contained in industrial gases. Cyclone collectors are traditionally employed to eliminate particles greater than approximately 5 microns, and concerted efforts have recently been made to extend their effectiveness to particles of approximately 1 micron.

The international patent application published under No. WO 93/15,822 describes a method for eliminating fine particles dispersed in a stream of fluid using the mixing effect of turbulence to separate and recover the fine particles in a specific and novel manner by passing the stream of fluid having turbulent flow through a channel with a free interior space along which is provided a zone communicating freely with the flow channel, in which the flow is impeded by a large number of objects close to each other within the flow section, which convert the turbulent flow into a viscous flow. Turbulent eddies carrying particles penetrate continuously into this zone, which forms a dilated viscous underlying layer, and deposit the particles on the surfaces of the objects present in this zone. Retention of the particles on the surfaces of the objects is improved if these objects are charged with static electricity. The devices operating according to the principle described above of recovery of the particles contained in fluid streams will be called "turbulent flow dust removers."

The present invention discloses means for effecting such a separation of particles that are not described in document WO 93/15,822. In all the embodiments, the mechanism of dust recovery is the same, namely turbulent deposition by penetration of vortices. The present patent application applies to all the embodiments described here and to future modifications later made thereto and based on this principle. Certain dust recovery or elimination means are described here, but they do not at all constitute the sole method for eliminating the dust collected. Some are based on purely physical means (employing gravity) and others are based on mechanical means (such as a grating, screw conveyor, convertor belt, shaker mechanism, quick-return agitation, etc.) Certain embodiments are useful for small-scale applications (up to 500 acfm), some are intended for medium-scale applications (up to 5000 acfm), and others can be modified for application to large-scale industrial units, but all are based on the same basic principle: that of turbulent deposition as described here and in Patent Application WO 93/15,822 as well as in Patent Application GB 9407441.6 A large number of the embodiments described can be used, in addition to elimination of particles, to eliminate harmful gases either by impregnation of the collecting surface with a suitable catalyst or an adsorbent such as activated charcoal, or by fine atomization of water or of a suitable aqueous solution injected into the turbulent gas with the collecting device. In the first case, the vortices continuously transport the harmful gas to the collecting surface where it reacts or is adsorbed. In the second case, the fine atomized jet is precipitated by turbulent deposition after absorbing the harmful gas. In this case, the turbulent flow dust remover functions as a wet dust remover. Dry screening is another area of application of the turbulent flow dust remover; it can be used to recover dry particles formed during the process. Certain additional means allowing recovery of particles are described below with reference to the attached figures wherein:

FIG. 1 is a front view of a plate disposed in a container and used in first additional means;

FIG. 4 is a front view showing exploded views of a turbulent flow dust remover according to a second embodiment of the third additional means;

1. First Additional Means, FIG. 1

Figure 2C:
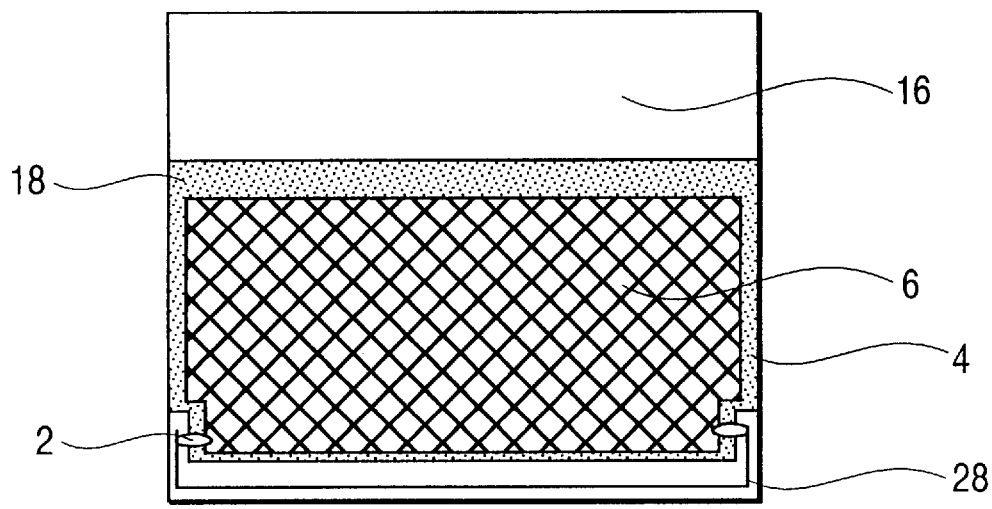
FIG. 2 is a side elevation with exploded views.
FIG. 2a of a turbulent flow dust remover according to second additional means; the quick-return mechanism
FIG. 2b is a front view FIG. 2c of a screening plate and a dust removal tray disposed in the container.

In the first additional means shown in FIG. 1, it is possible to place a relatively large number of plates 18 one behind the other transversely in container 10, either by placing them on the bottom of the container, as described in document WO 93/15,822, or by leaving a space between the bottom 20 of container 10 and the lower edges of plates 18. The gas flows in channel 16 in the form of a turbulent stream. Some or all of the plates have a plurality of slots 8 aligned one behind the other, forming spaces, which can be designated by the term "canyons," and which pass through the set of plates 18.

The width of each of these slots or canyons is variable but is preferably between about 3 mm and 10 mm. The spaces between the slots or canyons made in the plates are also variable, but are preferably between approximately 1 cm and approximately 30 cm. In tests performed on dispersed ASP 200 test dusts with a mean particle size of 1.8 μm, a container 10 that is 61 cm wide, a gas flow channel 16 that is 5 cm high, a plate spacing of 4 cm, a plate height of 15 cm, a gas flowrate of between 12 m/sec and 18 m/sec, and a dust remover 3.4 m long, the recovery efficiency with plates that had no "canyons" was 48% while with plates that had 13 "canyons" 3 mm wide the efficiency rose to 62%.

2. Second Additional Means, FIG. 2

In the second means for effecting particle separation, illustrated in FIG. 2, instead of the plurality of closely set transverse plates described in document WO 93/15,822, a relatively large number of mesh screens 6, each supported by a frame 4, said screens being disposed one behind the other, and with a space of approximately 0.5 cm to 2 cm between the bottom of dust removal tray 28 resting on sides 26 attached to the bottom of the channel, and the lower edge of a screen. Pins 2 designed to strike the screens are attached to the sides of tray 28. According to a preferred embodiment, a metal strip 18 with a width of between approximately 1 cm and 4 cm can be placed on the upper edge of each screen, replacing said screen. The screens can be any interval apart, preferably between approximately 0.5 cm and approximately 5 cm; they can be made of fibers, filaments, or metal wires with a diameter that is preferably between approximately 0.1 mm and approximately 1 mm. The size of the screen meshes can vary widely but is preferably between approximately 1 mm and approximately 10 mm. This arrangement is similar to that described in document WO93/15,822. The dust-laden gas penetrates container 10 through inlet 12, and flows through channel 16, and the cleaned gas is removed through outlet 14. The inlet and outlet have an edge 24. The fine particles are entrained by vortices due to the gas that flows through the free passageway above the screens to the area occupied by the screens, where the vortices are damped and the dust is deposited on the meshes of the screens (and on the metal strips located on the upper edges of the screens) then, after a deposit of sufficient thickness has formed, the deposited particles fall into the bottom of the device. Dust removal tray 28 is attached to a heavy steel plate 52 that is shaken with an amplitude of approximately 1 cm to 3 cm and at a frequency of approximately 2 Hz by means of shaft 36, by a quick-return cam 38, by means of a bellows 34, or any other suitable means, serving as a sealing element for drive shaft 36, and cam 38 is driven by a motor 40. The forward-backward speed ratio is approximately 2 or 3, the dust collected on the plate is sent to hopper 46 while the dust continues to be collected without interruption. The hopper is emptied by means of rotary valve 44. As can be seen in FIG. 2, the forward movement is from right to left. Another possibility is to place hopper 46 at the opposite end of container 10 where the cleaned gas leaves the system through outlet 14 instead of being near inlet 12. However, the forward movement in this case will be from left to right. The use of the screen instead of plates is advantageous because it increases the surface area accessible to the fine particles to be collected, which increases the particle recovery efficiency. The dust collected at the bottom of the system by shaking by means of a quick-return mechanism can also be eliminated when plates are used, whether they have no "canyons" as described in document WO 93/15,822 or whether they are provided with slots like those used in the first new means of the present invention.

3. Third Additional Means, FIGS. 3, 4, 5, 6, 7, 8, and 9

In the third additional means designed for particle separation, instead of the plurality of close-set transverse plates or screens, a mat made of a fibrous fabric or a pad disposed along the turbulent gas flow in the device is used. The fibrous fabric can be based on polyester, glass, metal, or ceramic fibers and has a porosity (voids ratio) of preferably between approximately 0.90 and approximately 0.999; the diameters of its fibers are between approximately 0.001 mm and approximately 0.1 mm so that there is an average space of approximately 0.5 mm to 2 mm between two adjacent fibers. The fibers of the pad can be charged with static electricity and/or the pad can be pleated. The thickness of the pad may be between approximately 1 cm and approximately 30 cm. This new embodiment of the invention is similar to some extent to the second additional means described in the present document, but it allows far finer collecting fibers to be used, so that the collecting surface areas are greater than those available with the screens; in addition, it offers certain advantages in construction and manufacture. The gas present in the high-porosity pads forms a dilated viscous boundary layer into which vortices from the turbulent gas stream penetrate and transport particles in suspension. The particles are trapped by the fibers by any known recovery mechanism. While in conventional filters the gas is made to enter on one side of the filter medium and to leave on the other side, bringing about an elevated pressure loss and gradual clogging of the medium, in the present invention most of the gas flows along the porous pad in an open channel, ensuring a high rate of particle recovery at a stable rate, as well as a drop in pressure which remains at a constantly low level and a high gas flowrate.

Figure 3:
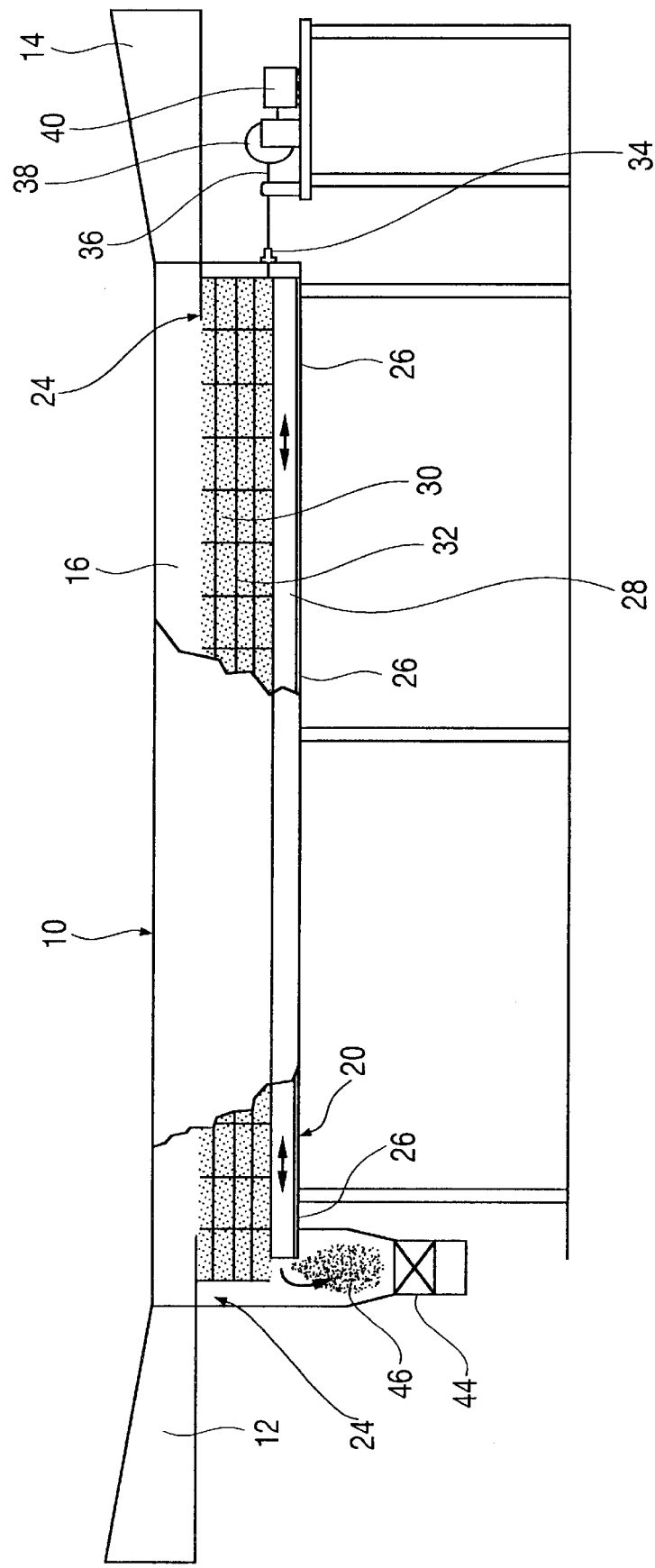
FIG. 3 is a side view of a turbulent flow dust remover according to one embodiment of third additional means.

3a) In the embodiment of the third additional means presented in FIG. 3, the turbulent flow dust remover has a container 10, an inlet 12 for the gas laden with fine particles, and an outlet 14 for the cleaned gas, disposed on a generally horizontal axis provided with edges 24. Inside container 10, the gas flows along passageway 16 below which is a mat comprised of a fibrous pad 30 held by a cage of metal wires 32 attached to a dust-removal tray 28 which is shaken intermittently or continuously by means of the quick-return mechanism described in the context of the embodiment illustrated by FIG. 2 and comprised of drive shaft 36, bellows 34, or another suitable sealing means, quick-return cam 38, and motor 40. During tests conducted with a pad of glass fibers 10 cm to 15 cm thick and with a porosity of 99.5%, formed of fibers with a diameter of approximately 30 μm, these tests were conducted under the same conditions as those described for the first additional means, the recovery efficiency was raised to 70%. This embodiment has other advantages such as the possibility of continuously eliminating the dust already collected from the device, as well as the much lower cost and weight of the pad by comparison to the plates.

3b) The embodiment presented in FIG. 4 has great similarities with the embodiment illustrated in FIG. 3. It has a similar container 10 with an inlet 12 and an outlet 14 designed for the gas, and edges 24, but is disposed on an axis oriented about 70 degrees to the horizontal. The gas flows through channel 16, under which is a fibrous pad 30 held by a cage of metal wires 32 welded to a heavy steel plate 52 which is shaken by a drive shaft 36 driven by a shaker mechanism 50 mounted on a support 54 and operating at amplitudes and frequencies similar to those described relative to the embodiment of FIG. 2, but which is not necessarily of the quick-return type. Bellows 34 or any other suitable means serves as a sealing element for drive shaft 36. The metal-wire cage slides on guides 26. The dust knocked off the fibers by the shaking falls into dust removal channel 48 and slides on the bottom 20 of container 10 by gravity and falls into hopper 46 whence it is removed through rotary valve 44.

Figure 5B:
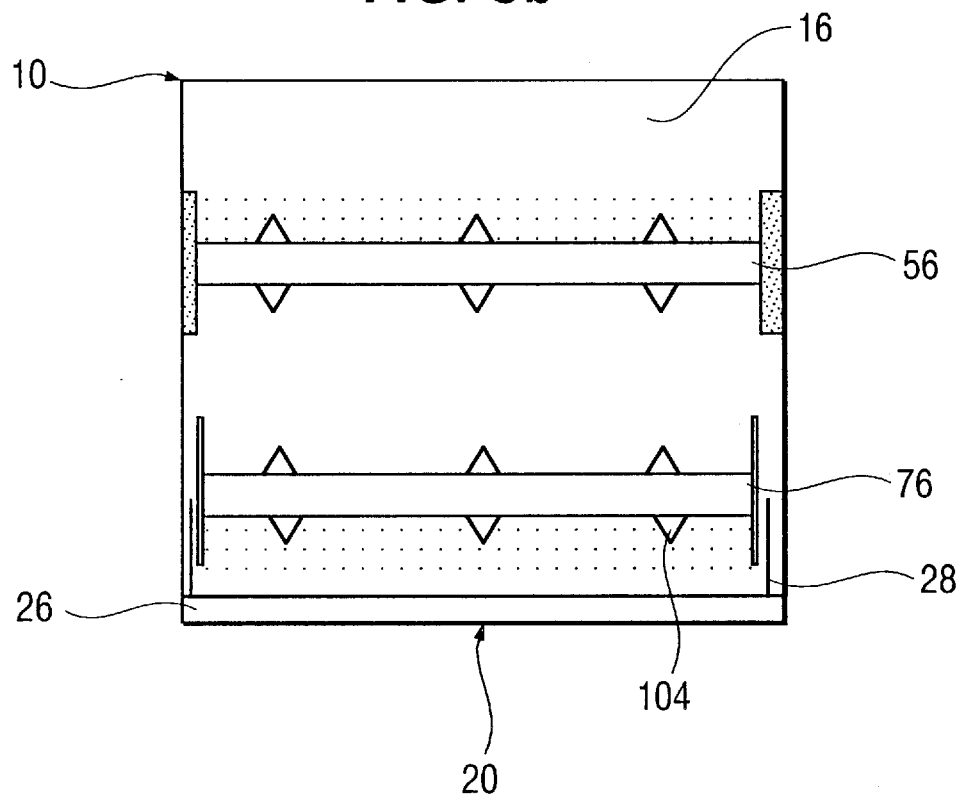
FIG. 5b is a cross section through a turbulent flow dust remover according to a third embodiment of the third additional means.
Figure 5A:
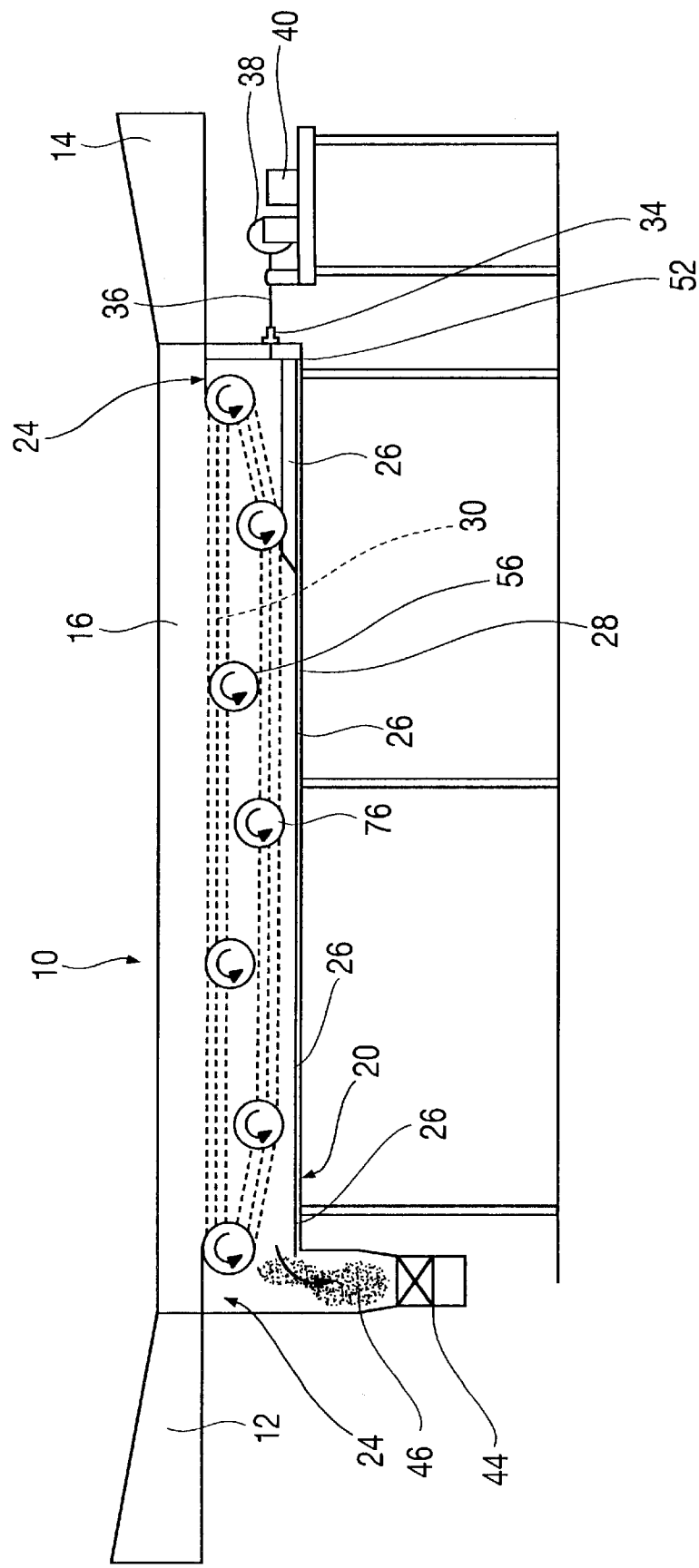
FIG. 5a is a side view with exploded views (a) of a dust remover according to a third embodiment.

3c) The third embodiment of the third additional means of the invention is illustrated FIGS. 5a and 5b. Container 10, inlet 12 and outlet 14, edges 24, gas flow channel 16, dust removal plate 28 to which is attached heavy steel plate 52, guides 26, bottom 20, the quick-return mechanism including quick-return cam 38, drive shaft 36, the bellows or any other appropriate means 34, and motor 40, hopper 46, and rotary valve 44 are all identical to the corresponding components in the embodiment described with reference to FIG. 2 of this document. In this embodiment, the fibrous fabric is used in the form of a belt moved at low speed by shafts 56 equipped with pinions (not numbered). The dust is collected by the belt in the upper run and is removed by dust removal shafts 76, also provided with pinions 104, in the lower run. The shafts are controlled by a motor (not shown).

Dimensions

Figure 6A:
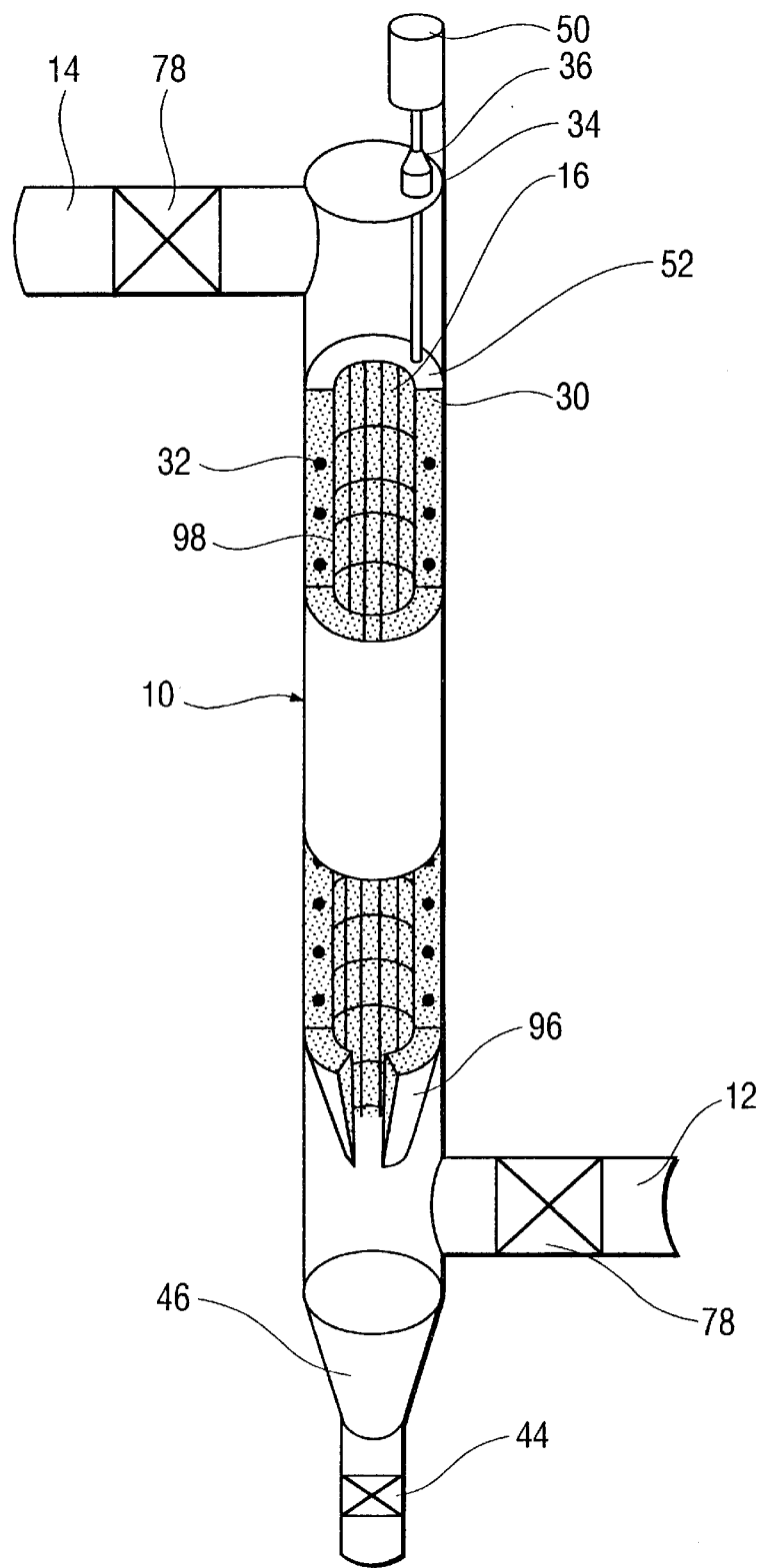
FIG. 6 is a perspective view with exploded views (a) and a cross section perpendicular to the main axis (b) of a turbulent flow dust remover according to a fourth embodiment of the third additional means.
Figure 6B:
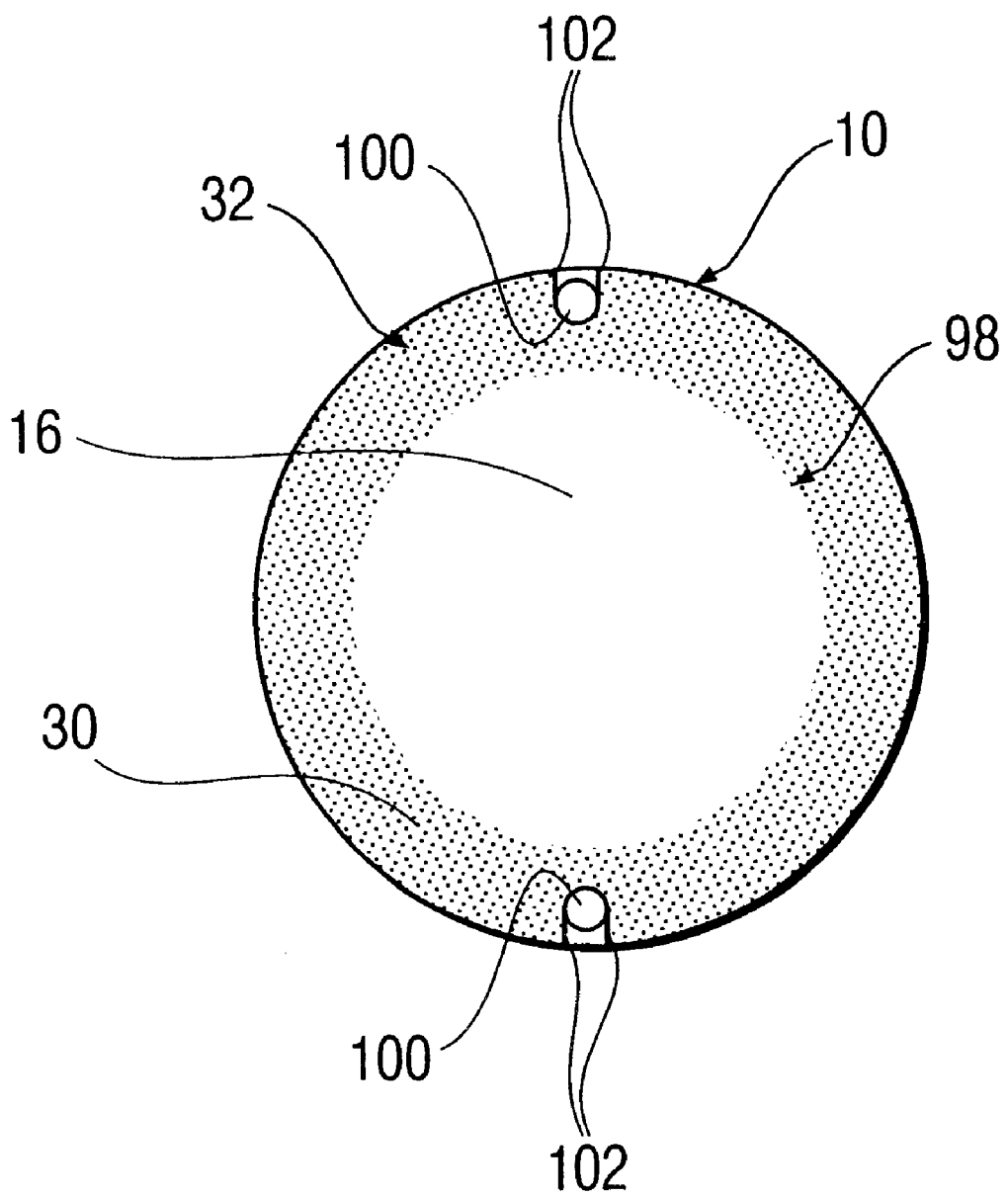

The typical dimensions of all the embodiments described hereinabove are the following. The width of container 10 is between 10 cm and 1 m and preferably amounts to approximately 50 cm, the height of flow channel 16 is between 1 cm and 20 cm and preferably amounts to approximately 5 cm, the thickness of fibrous pad 30 is between 1 cm and 30 cm and preferably amounts to approximately 10 cm. The length of the container depends on the task to be accomplished and the recover efficiency desired. The gas flowrate in flow channel 16 is between approximately 1 m/sec and 30 m/sec and amounts to preferably approximately 15 m/sec. Quick-return cam 38 has a forward-backward speed ratio of approximately 2 to 3, the travel is approximately 2 cm, and the frequency is approximately 2 Hz 3d) A fourth embodiment of the third additional means of the invention, in which fibrous fabrics or pads having the properties described above are used, is illustrated FIGS. 6a and 6b. The container consists in this case of a tube 10 provided with an inlet 12 for the dust-laden gas and an outlet 14 for the cleaned gas, equipped with valves 78. Inside tube 10, fibrous fabric 30 is inserted between two concentric tubes consisting of a grid of medium metal wire or thin metal rods. The tube formed by inner tubular grid 98 constitutes the flow channel 16; it is attached to outer tubular grid 32 by a plate 52 with a reinforced head. The cage can move up and down inside container 10, guided by two rods 100 which are firmly joined to grid 32 and which slide in guides 102 mounted inside container 10, as shown in FIG. 6b. A funnel-shaped conical plate 96 connects the lower end of outer tubular grid 32 to the lower end of inner tubular grid 98. The cage, made of tubular grids 32 and 98, of fibrous fabric packing 30, reinforced-head plate 52, and cone 96, is shaken intermittently in a reciprocating movement by mechanism 50, which can be a quick-return mechanism or a simple cam mechanism. Drive shaft 36 is attached to reinforced plate 52 by bellows 34 or by any other sealing element designed for the purpose. The dust falls into hopper 46 whence it can be removed through rotary valve 44. The diameter of inner tubular grid 98 is between 2 cm and 40 cm, preferably between approximately 10 cm and 20 cm, and the thickness of fibrous fabric packing 30 is between 2 cm and 15 cm, preferably between approximately 5 cm and 10 cm; the gas flowrate is between approximately 2 m/sec and 30 m/sec. The length of tubular pad 30 is between 3 m and 30 m, depending on the task to be accomplished. In the case of high gas flowrates, as are ordinarily encountered in industry, a large number of inner tubular grids is attached to the same reinforced-head plate, and the array of tubes is fitted into a large outer grid whose upper perimeter is attached to the plate with the head. The space between the inner tubular grids, the head plate, and the outer grid is packed with a fibrous fabric. At the bottom of the fibrous fabric, under each inner tube, is a funnel-shaped cone whose upper end is attached to the grooved bottom of the cage. The entire cage slides inside a container and is shaken intermittently, in a reciprocating movement, by a shaker located at the upper end of the container. The dust is sent to a hopper whence it is removed through a rotary valve. During tests performed with a layer 10 cm thick of a fiberglass pad with a porosity of 99.5% made of fibers with a diameter of approximately 30 $\mu$m, the tubular gas flow channel 16 with an inside diameter of 20 cm, a tube 3 m long, and a gas flowrate of between 12 m/sec and 18 m/sec, the recovery efficiency of standard ASP 200 test dust measured was 78%.

Figure 7A:
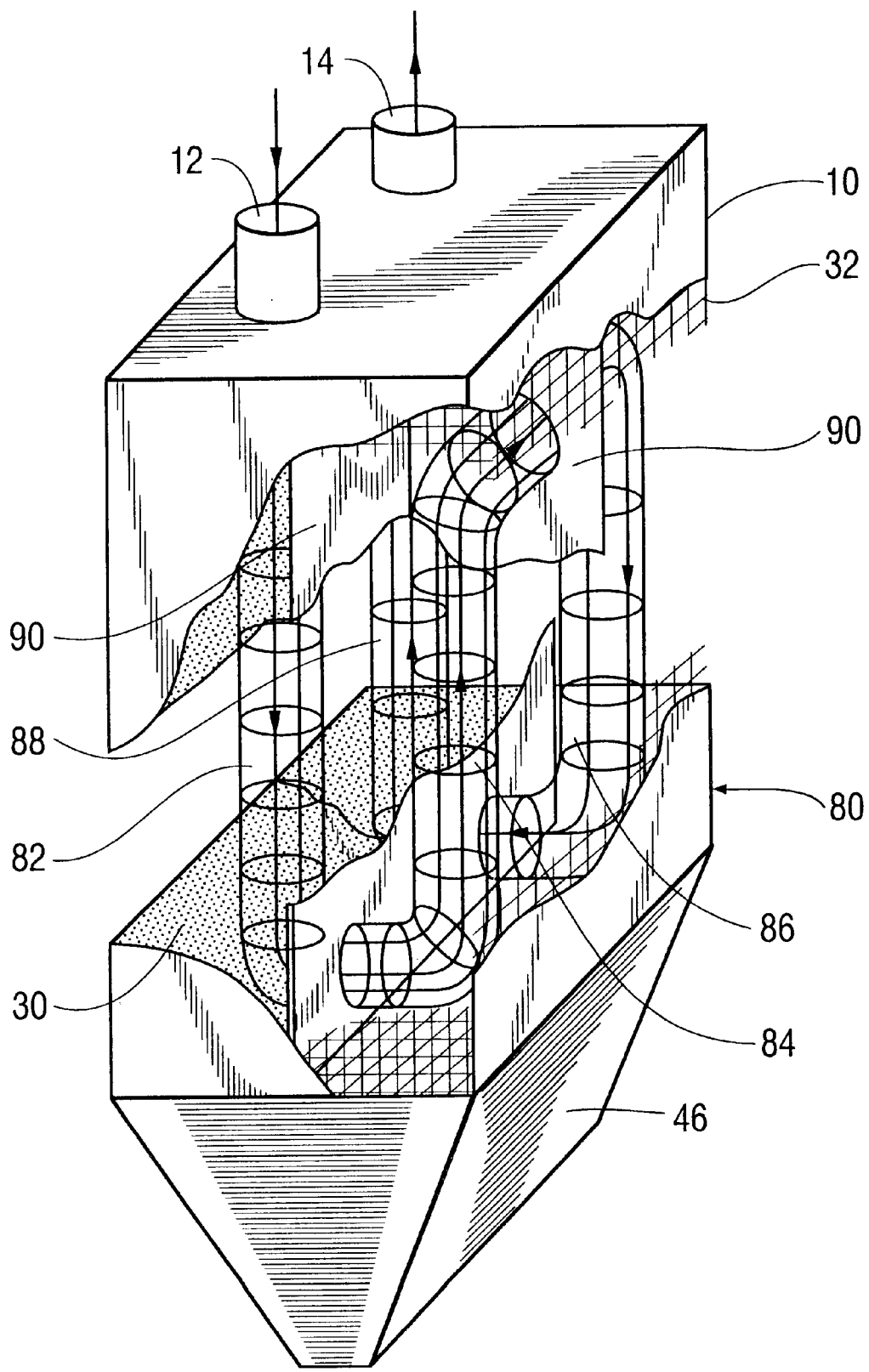
FIG. 7 shows two perspective views of a turbulent flow dust remover according to a fifth embodiment of the third additional means, of which one (7a) shows exploded views and the other (7b) shows the location of sections: a cross section along main axis FIG. 7c and two cross sections perpendicular to the main axis.
FIG. 7d and FIG. 7e.
Figure 7B:
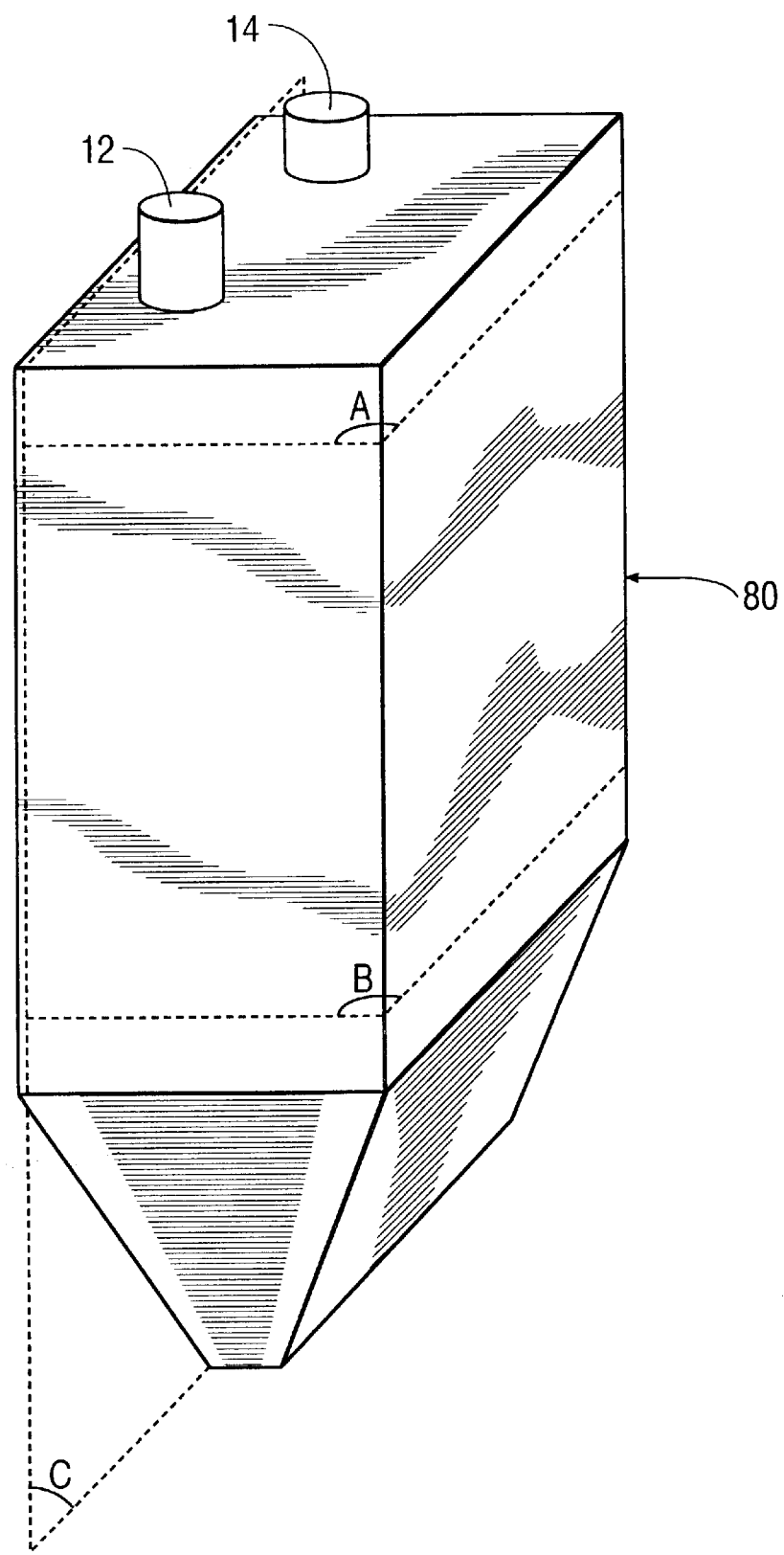

3e) A fifth embodiment of the third additional means of the invention, including fibrous fabrics or pads with the properties described above, is illustrated by FIGS. 7a to 7e. It has a rectangular container 10 in which a rectangular cage 32 is placed, said cage being freely adjustable and being separated into four equal compartments by fluidtight partitions 90. The dust-laden gas penetrates through inlet 12 into a tube comprised of an average-sized metal wire grid, first into compartment 82, then into compartment 84, and then into compartment 86, and the cleaned gas finally leaves compartment 88 via outlet 14. The space between the cage and the tube comprised of a grid is packed with a fibrous fabric. A flexible element 108, shown in the cross section of FIG. 7c, connects inlet 12 and outlet 14 to the two ends of the tube whose wall is composed of a grid. The outer appearance of the housing is shown in FIG. 7b, in which the positions of the sections are also indicated. The upper part of the cage is formed of a reinforced-head plate 52 connected by drive shaft 56 to a shaker which allows the cage to execute and alternately upward and downward movements. FIGS. 7d and 7e are two horizontal sections of the equipment whose positions are indicated in FIG. 7b. The dust shaken off the fibers lands in hopper 46 from which it is removed by various appropriate means such as for example a screw conveyor. The number of compartments or passages is not limited to four as in this embodiment; they can also be numerous if this is deemed necessary or appropriate. The dimensions chosen in this embodiment are identical to those adopted in the previous embodiment illustrated in FIG. 6. This embodiment offers the possibility of using a device with a flow channel whose useful length is the same as that chosen for the previous embodiment, but whose height is very much less.

Figure 8A:
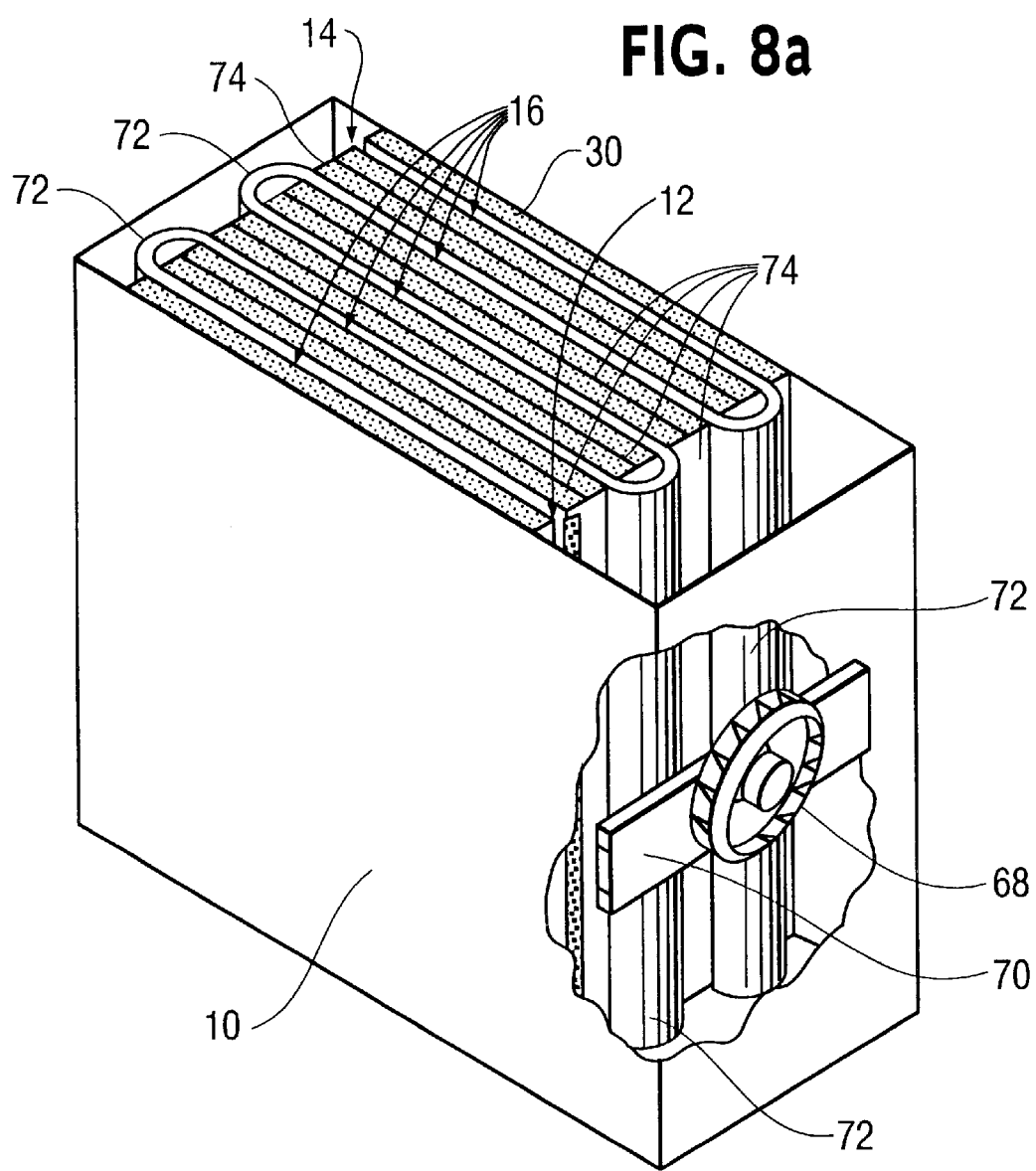
FIG. 8 shows a perspective view with exploded views FIG. 8a and a horizontal section FIG. 8b of a turbulent flow dust remover according to a sixth embodiment of the third additional means.
Figure 8B:
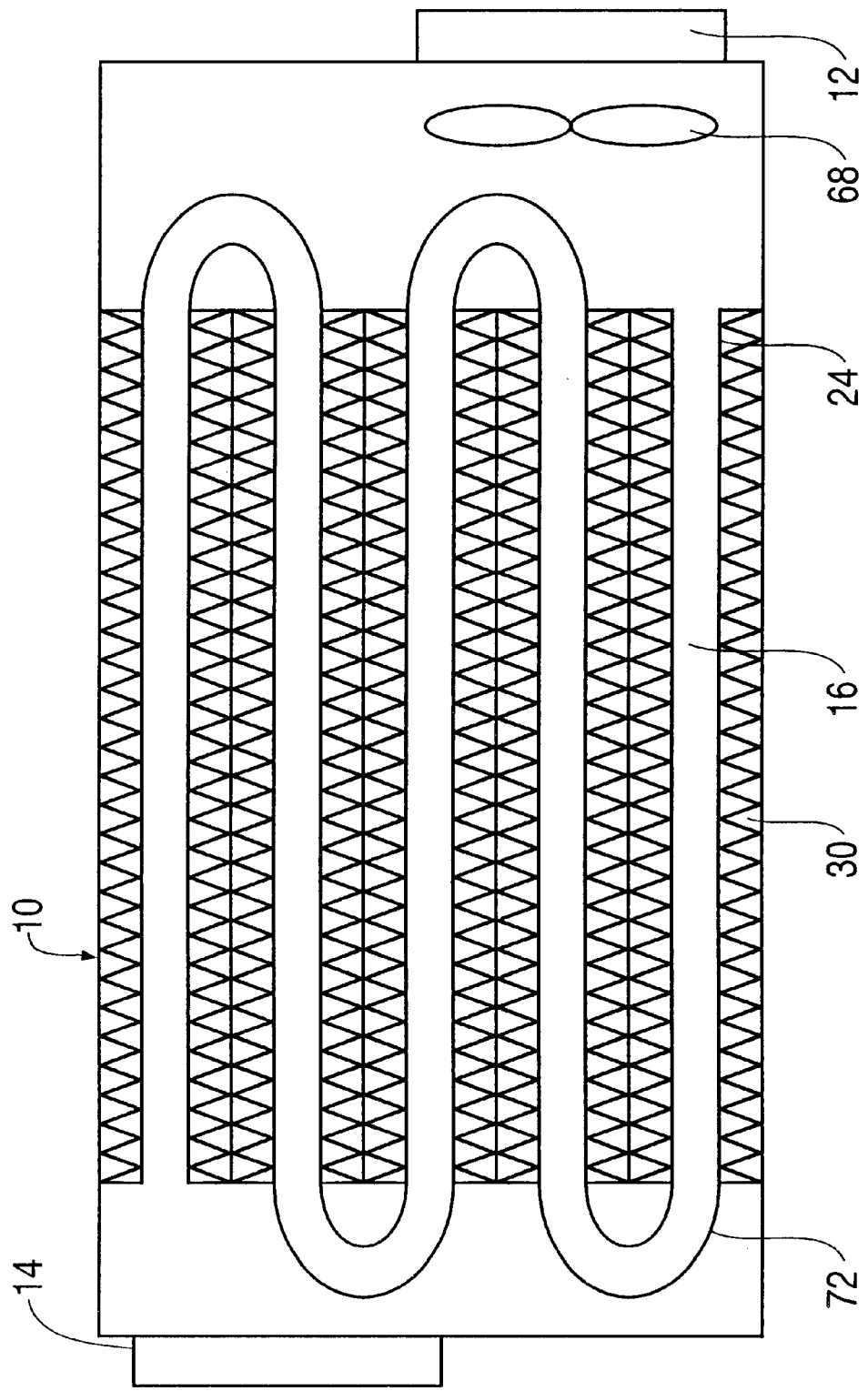

3f) A sixth embodiment of the third additional means of the invention, including fibrous fabrics or pads whose properties are described above, is illustrated by FIGS. 8a and 8b. It is comprised of modules formed of two fitted fibrous pads 30 approximately 1 cm to 2 cm thick, disposed horizontally or vertically, spaced 1 to 3 cm apart, and forming a channel 16 approximately 50 cm high and approximately 50 cm long, through which the air/gas flow circulates in the form of a turbulent flow. According to a preferred form of this embodiment, represented by a top view in FIG. 8b, pads 30 are pleated, the pleats being oriented perpendicularly relative to the direction of the circulation of the turbulent gas/air flow, similarly to the screens whose orientation is shown in FIG. 2. FIG. 8b also shows the holding edges 24 disposed at the ends of each passage. Another feature of this embodiment resides in the fact that the dust is collected on both sides of the channel traversed by the turbulent gas/air flow. It is for this reason that this embodiment is called a double-sided collector; the arrangement of the collecting pads 30 resembles that of the collecting electrodes in plate-type electrical dust removers. In this embodiment, several modules (five in FIG. 8) such as those described and above and disposed side by side are connected in series by U-shaped connectors 72 such that the gas/air flow direction changes 180° each time the air passes from one module to another. The dust-laden air-gas flow penetrates through inlet 12 and the cleaned air/gas flow is exhausted via outlet 14. Fitted pads 30 are inserted into a structure 74 composed of two front plates and four partitions accommodated in housing 10. The gas/air flow is introduced by means of fan 68 mounted on support 70. This embodiment is particularly advantageous for applications such as cleaning air in dwellings and offices where the air has little dust, so that the fibrous pads do not require frequent cleaning. For units requiring extremely high recovery efficiencies, pleated or flat collector pads charged with static electricity can be used, and/or for deodorization, pads containing an appropriate adsorbent such as activated charcoal can be used instead of certain existing pads. Enlarged versions of the double-sided collectors of this embodiment can be used for cleaning industrial gases. However, in this case, the collector pads must be cleaned regularly by agitation or by another other appropriate method. In a test unit whose flow channel 16 is 1.3 cm wide and has a useful length of 2.5 m, pleated fibrous pads 30, 2.5 cm thick, and an air flowrate of 6.5 m/sec, the recovery efficiency of standard ASP 200 test dust measured was 92%. In the same test unit, with air moving at the same rate, 100% of the dust formed of particles 5 μm in diameter was collected from the ambient air in tests performed with pleated fibrous pads 30, 2.5 cm thick, and charged with static electricity.

Figure 9:
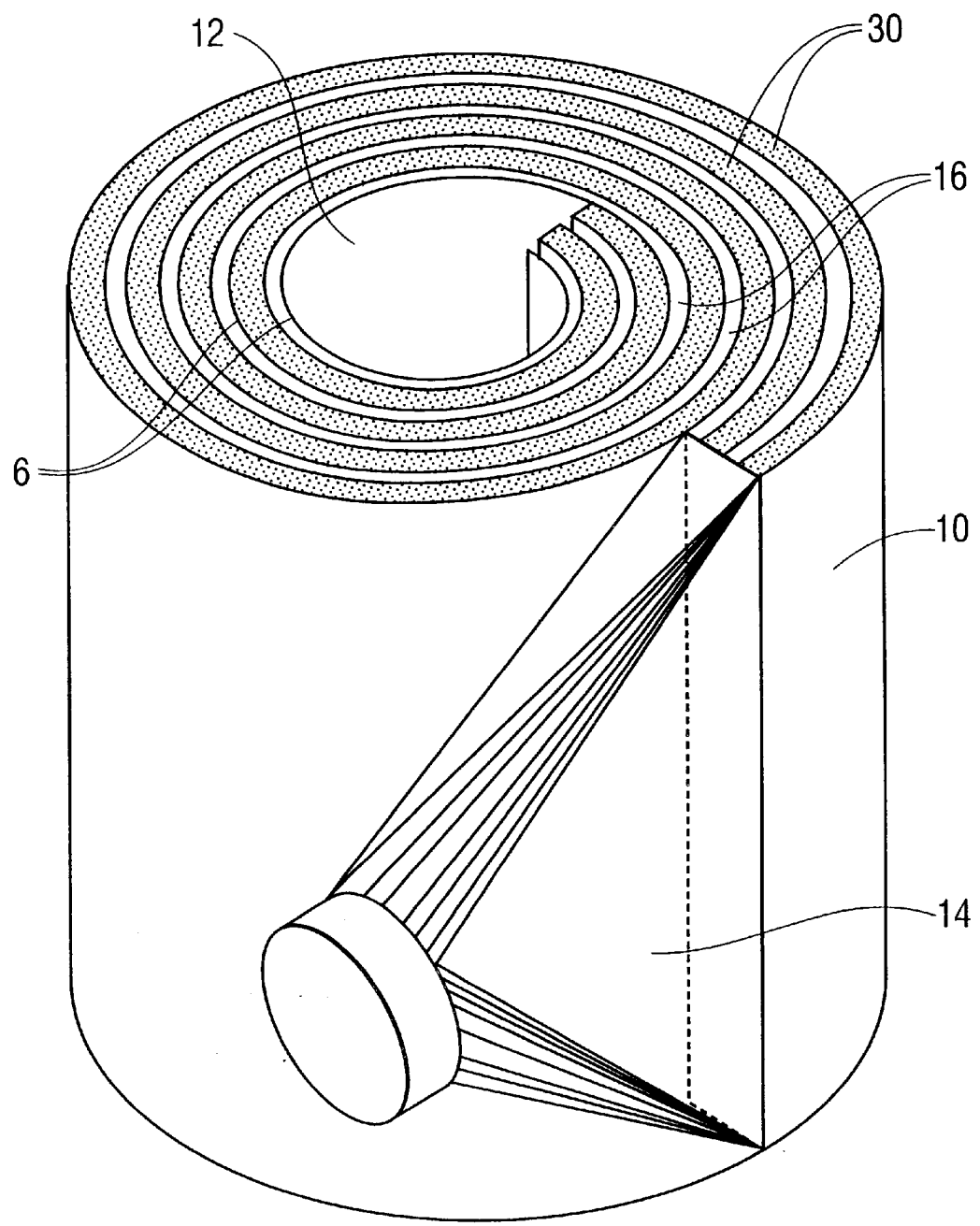
FIG. 9 shows a perspective view with exploded views of a turbulent flow dust remover according to a seventh embodiment of the third additional means.

3g) The seventh embodiment of the third additional means of the invention, including fibrous fabrics or pads, is illustrated by FIG. 9. It consists of a spiral configuration of pad 30 disposed on an impermeable sheet 106. This sheet, on which the pad is mounted, is spiral-wound such as to leave a space 16 between two consecutive turns, thus forming two parallel gas channels 16. The spiral turbulent flow dust remover is placed in a cylindrical container 10, with the inlet 12 for the dust-laden gas being at its center and the outlet 14 for the cleaned gas being located tangentially on the outer periphery of the cylinder. The lid of the unit, to which the inlet is connected, is not shown in FIG. 9. As can be seen in this figure, this embodiment is also very well suited for cleaning air in dwellings and offices where the air contains little dust. The unit requires only periodic cleaning at widely-spaced intervals, which may be by agitation or by suction. The width of an air passage is between approximately 1 cm and 3 cm. The thickness of the pad is between approximately 2 cm and 5 cm and the height of the unit varies between approximately 10 cm and 50 cm. One of the advantages of this spiral configuration resides in the fact that it favors the appearance of turbulent flow conditions for Reynolds number values (namely, for a given system, with a gas having a lower flowrate) that are lower than those encountered in a straight channel. Enlarged version of the spiral turbulent flow dust remover can also be used for cleaning industrial gases. In this case, however, the collector pads require periodic cleaning by agitation or by any other appropriate means. In a test unit with a flow channel 16 with a width of 1.3 cm, a fibrous pad 30 with a thickness of 2.5 cm, a useful length of channel 16 of 3 m, and an air circulation rate of 2.5 m/sec, the recovery efficiency of standard ASP 200 test dust measured was 92%.

In summary, the present invention provides a number of novel structures and implementation methods for effective elimination of particles, generally of very small size, suspended in industrial gases or in air. Modifications are possible without departing from the framework of this invention.

We claim:

1. Method for elimination of particles contained in a fluid stream with turbulent flow, comprising passing the fluid stream through a passage within a container, providing a plurality of spaced plates oriented transversely relative to the direction of fluid stream flow, the plates having slotted edges communicating with the stream of fluid to allow penetration of vortices from at least part of said stream into spaces defined between the plates disposed near each other and recovery of said particles from the surfaces of said plates as the vortices are damped.

2. Device for eliminating the particles contained in a stream of fluid comprising a container with a passage for the fluid stream in turbulent flow and a plurality of plates adjacent the passage and oriented transversely relative to the direction of flow, said plates having edges communicating with the stream of fluid, defining at least one side of the passage and having between them at least one stagnant space where the particles are recovered;

characterized in that
the plates provided with slots that extend inward from said edges.

3. Device according to claim 2, characterized in that the turbulent flow is transformed into viscous flow in said at least one stagnant space.

* * * * *